US010532616B2

United States Patent
Kamiyama et al.

(10) Patent No.: US 10,532,616 B2
(45) Date of Patent: Jan. 14, 2020

(54) VEHICLE WHEEL

(71) Applicant: HONDA MOTOR CO., LTD., Tokyo (JP)

(72) Inventors: Youichi Kamiyama, Wako (JP); Katsushi Ishii, Wako (JP); Jung-un Park, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/085,133

(22) PCT Filed: Mar. 16, 2017

(86) PCT No.: PCT/JP2017/010811
§ 371 (c)(1),
(2) Date: Sep. 14, 2018

(87) PCT Pub. No.: WO2017/159833
PCT Pub. Date: Sep. 21, 2017

(65) Prior Publication Data
US 2019/0105945 A1    Apr. 11, 2019

(30) Foreign Application Priority Data

Mar. 16, 2016   (JP) ................. 2016-052036

(51) Int. Cl.
*B60C 19/00*  (2006.01)
*B60B 21/02*  (2006.01)
(Continued)

(52) U.S. Cl.
CPC ............ *B60C 19/002* (2013.01); *B60B 21/02* (2013.01); *B60B 21/026* (2013.01); *B60B 21/12* (2013.01);
(Continued)

(58) Field of Classification Search
CPC ...... B60B 21/12; B60B 21/026; B60B 21/023; B60C 19/00; B60C 19/002
See application file for complete search history.

(56) References Cited

U.S. PATENT DOCUMENTS 7,896,044 B2 *  3/2011  Kashiwai .................. B60B 3/04
                                                        152/381.6
8,286,679 B2 * 10/2012  Kamiyama ............... B60B 1/08
                                                        152/381.6
(Continued)

FOREIGN PATENT DOCUMENTS

DE    112015001233 T5   12/2016
JP    2008-105519 A      5/2008
(Continued)

OTHER PUBLICATIONS

International Search Report by ISA/JP dated Apr. 25, 2017, on PCT/JP2017/010811 (4 pages).
(Continued)

*Primary Examiner* — Jason R Bellinger
(74) *Attorney, Agent, or Firm* — Rankin, Hill & Clark LLP

(57) ABSTRACT

A wheel width direction (Y) cross-section of a well portion (11A) includes a hump portion (H1) and a hump portion (H2) that protrude to the outside (Z1) in a wheel radial direction (Z), and a curved surface (11s) that connects hump portion (H1) and hump portion (H2) and is sunken to the inside (Z2) in the wheel radial direction (Z). The curved surface (11s) is formed as a series of circular arcs (11e, 11f, 11g) that have centers of curvature (O1, O2, O3) that are further to the outside (Z1) in the wheel radial direction (Z) than the curved surface (11s).

5 Claims, 7 Drawing Sheets

(51) Int. Cl.
    *B60B 21/12*     (2006.01)
    *G10K 11/172*     (2006.01)

(52) U.S. Cl.
    CPC ...... *G10K 11/172* (2013.01); *B60B 2360/322* (2013.01); *B60B 2900/111* (2013.01); *B60B 2900/112* (2013.01); *B60B 2900/113* (2013.01); *B60B 2900/133* (2013.01); *B60B 2900/311* (2013.01); *B60B 2900/511* (2013.01)

(56) References Cited

U.S. PATENT DOCUMENTS

| | | | |
|---|---|---|---|
| 8,418,735 B2* | 4/2013 | Kamiyama | B60B 1/08 |
| | | | 152/381.6 |
| 10,131,190 B2* | 11/2018 | Kamiyama | B60B 21/026 |
| 2008/0179939 A1* | 7/2008 | Kusaka | B60B 21/023 |
| | | | 301/95.104 |
| 2011/0057505 A1 | 3/2011 | Nagata et al. | |
| 2017/0021666 A1* | 1/2017 | Kamiyama | B60B 21/10 |
| 2017/0096028 A1 | 4/2017 | Kamiyama et al. | |
| 2018/0022151 A1* | 1/2018 | Kamiyama | B60B 21/02 |
| | | | 301/95.104 |
| 2019/0009614 A1* | 1/2019 | Kuramochi | B60B 21/12 |
| 2019/0070894 A1* | 3/2019 | Kamiyama | B60B 21/02 |
| 2019/0077189 A1* | 3/2019 | Kamiyama | B60B 21/02 |
| 2019/0077190 A1* | 3/2019 | Kamiyama | B60B 21/02 |

FOREIGN PATENT DOCUMENTS

| | | |
|---|---|---|
| JP | 2011-057006 A | 3/2011 |
| JP | 2015-174495 A | 10/2015 |
| JP | 2015-174502 A | 10/2015 |

OTHER PUBLICATIONS

Written Opinion by ISA/JP dated Apr. 25, 2017, on PCT/JP2017/010811 (5 pages).
German Office Action with English translation dated Apr. 16, 2019, 15 pages.

* cited by examiner

FIG.3

|  | DIFFERENCES FROM TARGET VALUE | |
|---|---|---|
|  | RIM LATERAL RIGIDITY | WEIGHT |
| COMPARATIVE EXAMPLE 1 | −23% | +0% |
| COMPARATIVE EXAMPLE 2 | +1% | +9% |
| FIRST EMBODIMENT | 0% | +2% |

VEHICLE WHEEL

TECHNICAL FIELD

The present invention relates to a vehicle wheel.

BACKGROUND ART

There is conventionally known a wheel having a Helmholtz resonator (sub-air chamber member) attached to the outer circumferential surface of a well portion to deaden the pipe resonance inside a tire air chamber (see, for example, Patent Literature 1).

CITATION LIST

Patent Literature

Patent Literature 1: Japanese Patent Application Publication No. 2015-174495

SUMMARY OF INVENTION

Technical Problem

In the vehicle wheel described in Patent Literature 1 for a tall and narrow resonator attached thereto, however, a deep well portion 102 is formed in a rim 101 as illustrated in FIG. 7 (see the solid lines). Thus, when lateral force (see the arrow) is applied to a tire 103 while the vehicle is running, an R portion surrounded by circles 104, 105 in FIG. 7 bends and deforms more than in a regular normal rim, as indicated with dot-dot-dash lines, and the rim 101 may deform in such a direction as to widen laterally. For this reason, there is room for further improvement in steering stability.

The present invention aims to provide a vehicle wheel capable of reducing the amount of deformation of a rim to improve steering stability.

Solution to Problem

The present invention is a vehicle wheel comprising a sub-air chamber member as a Helmholtz resonator attached to an outer circumferential surface of a well portion, wherein the well portion includes a first hump portion and a second hump portion protruding radially outward in a sectional view in a width direction, and a curved surface that connects the first hump portion and the second hump portion to each other and is recessed radially inward.

According to the above configuration, the entire part of the curved surface from the first hump portion to the second hump portion forms an R shape in a sectional view in the width direction. In other words, the well portion whose sectional shape has no straight portions can mitigate stress concentration and reduce the amount of deformation of the well portion. Thereby, the rigidity of the rim against lateral widening can be enhanced to improve steering stability.

In addition, the curved surface has a single curvature between the first hump portion and the second hump portion.

The curved surface thus having a single curvature can disperse stress on the well portion evenly, and therefore can reduce the amount of deformation of the well portion even more. Thereby, steering stability can be improved even more.

A radius of curvature of the curved surface is set to be longer than half a distance between the first hump portion and the second hump portion.

According to this configuration with a long radius of curvature (with a small curvature), a portion with a steep curve (a curvy portion) like in the conventional art can be reduced, which makes it possible to reduce stress concentration at the well portion and reduce the amount of deformation of the well portion even more. Thereby, steering stability can be improved even more.

In addition, the curved surface is formed by a plurality of consecutive arcs whose centers of curvature are situated radially outward of the curved surface.

The above configuration makes it easy to form a well portion of a deep recessed shape for a tall, narrow resonator. For example, the well portion can have a shape such that the left and right sides extend upward when the curved surface is formed by a curved surface with a large radius of curvature in the center in the width direction and curved surfaces with radii of curvature smaller than that of the center curved surface at both sides of the center curved surface. Thereby, a well portion with a deep recessed portion can be easily formed, which makes it easy to mount a tall and narrow resonator.

Further, the present invention is a vehicle wheel comprising a sub-air chamber member as a Helmholtz resonator attached to an outer circumferential surface of a well portion, wherein the well portion includes a first hump portion and a second hump portion protruding radially outward in a sectional view in a width direction, and a connection surface that connects the first hump portion and the second hump portion to each other and is recessed radially inward, and the connection surface has, in the sectional view in the width direction, a straight line and first and second curved lines situated to sandwich the straight line.

According to this configuration, the first curved line is formed from the straight line to the first hump portion, and the second curved line is formed from the straight line to the second hump portion. Thus, stress concentration can be mitigated, and the amount of deformation of the well portion can be reduced. Thereby, rigidity of the rim against lateral widening can be enhanced to improve steering stability.

In addition, radii of curvature of the first curved line and the second curved line are set to be longer than a length of the straight line in the width direction.

According to the above configuration, the curving shape from the straight line to the first curved line and the curving shape from the straight line to the second curved line are further mitigated. Thus, stress concentration can be mitigated even more, and the amount of deformation of the well portion can be reduced even more. Thereby, the rigidity of the rim against lateral widening can be enhanced to improve steering stability even more.

Advantageous Effects of Invention

The present invention can provide a vehicle wheel capable of reducing the amount of deformation of a rim to improve steering stability.

BRIEF DESCRIPTION OF DRAWINGS

FIG. 3 is a table of differences between rim lateral rigidity and its target value and between weight and its target value in the first embodiment and comparative examples.

DESCRIPTION OF EMBODIMENTS

Next, embodiments of the present invention are described in detail with reference to the drawings where necessary.

First Embodiment

Figure 1:
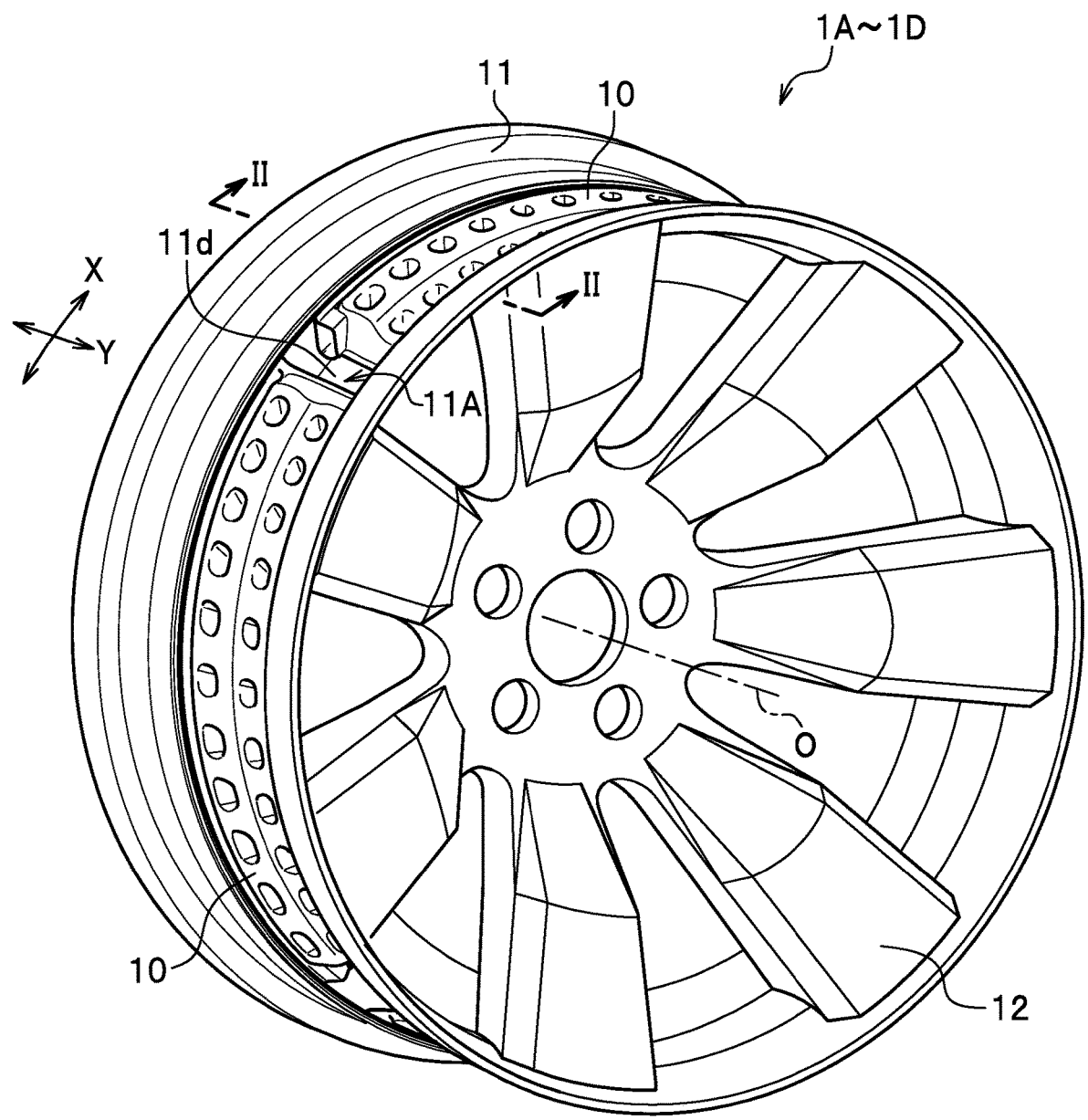
FIG. 1 is a perspective view of a vehicle wheel according to a first embodiment.

FIG. 1 is a perspective view of a vehicle wheel according to a first embodiment.

As illustrated in FIG. 1, a vehicle wheel 1A of the first embodiment has a plurality of sub-air chamber members 10 as Helmholtz resonators at equal intervals in the wheel circumferential direction X. Although the present embodiment has four sub-air chamber members 10, the present invention is not limited to having four sub-air chamber members 10, and the number and arrangement of the resonators can be changed appropriately.

The vehicle wheel 1A includes a rim 11 and a disk 12 that links the rim 11 to a hub (not shown). The sub-air chamber member 10 is attached by being fitted onto the outer circumferential surface 11d of a well portion 11A.

First, a description is given of the rim 11 to which the sub-air chamber members 10 are attached.

Figure 2:
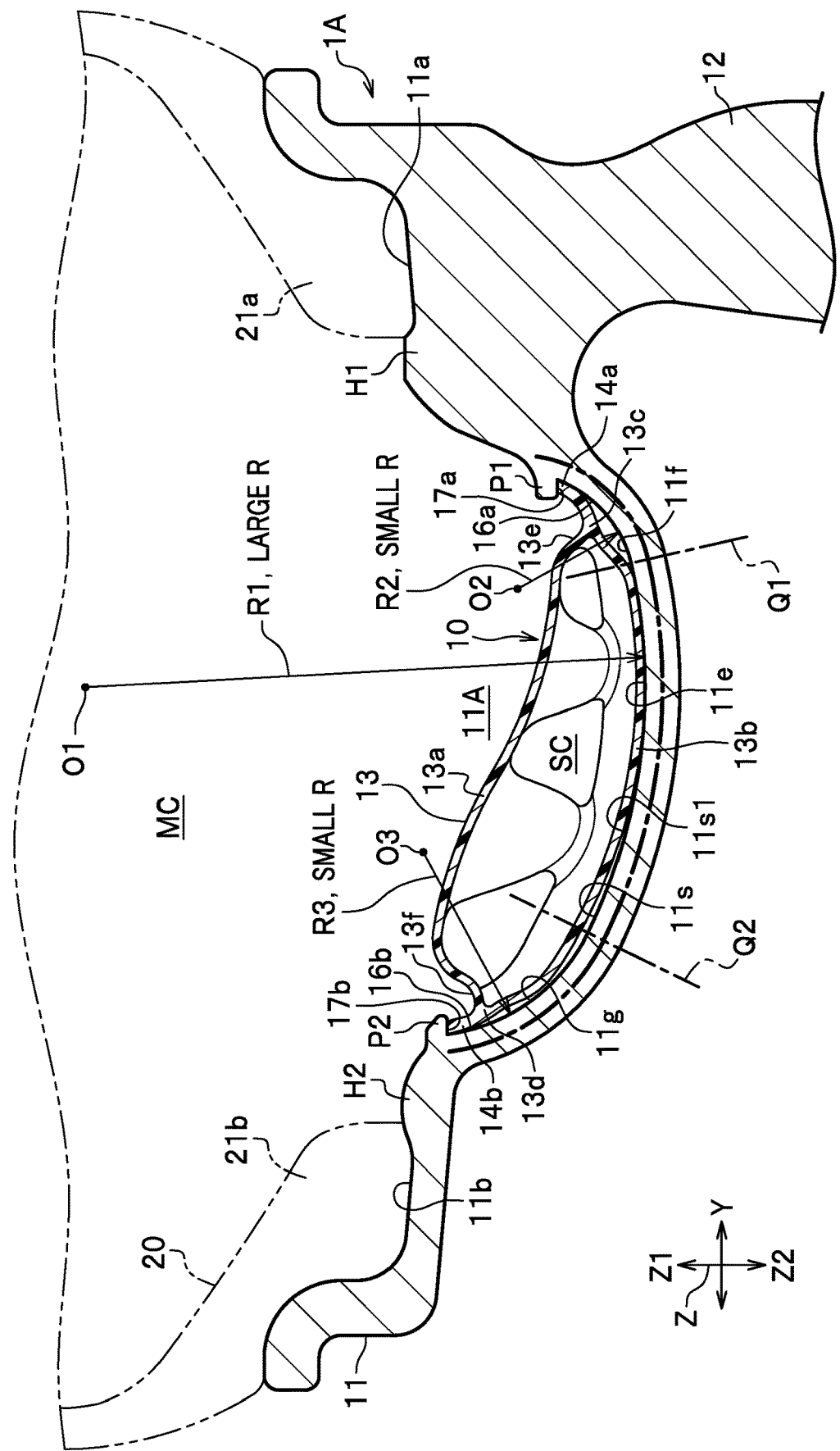
FIG. 2 is a partially enlarged sectional view of a section taken along the line II-II in FIG. 1.

FIG. 2 is a partially enlarged sectional view of a section taken along the line II-II in FIG. 1. Note that FIG. 2 partially depicts a part of a tire 20 near beads 21a, 21b mounted to the rim 11 with imaginary lines (dot-dot-dash lines).

As illustrated in FIG. 2, the rim 11 has the well portion 11A recessed toward an inner side Z2 in the wheel radial direction Z (downward in FIG. 2) between bead seats 11a, 11b formed at respective two end portions in the wheel width direction Y (the width direction). In other words, the well portion 11A is formed so that the curved recessed surface may be oriented toward an outer side Z1 in the wheel radial direction Z.

The bead seat 11a has a hump portion H1 (a first hump portion) on the well portion 11A side, the hump portion H1 protruding toward the outer side Z1 in the wheel radial direction Z in a sectional view in the wheel width direction Y (a sectional view in the width direction). The bead seat 11b has a hump portion H2 (a first hump portion) on the well portion 11A side, the hump portion H2 protruding toward the outer side Z1 in the wheel radial direction Z in a sectional view in the wheel width direction Y (a sectional view in the width direction). In other words, in the rim 11, the well portion 11A is integrally formed connecting the hump portion H1 and the hump portion H2 to each other.

The well portion 11A has a curved surface 11s that connects the hump portion H1 and the hump portion H2 to each other and is recessed toward the inner side Z2 in the wheel radial direction Z. Note that for convenience purposes, in FIG. 2, a curve parallel to the curve of the curved surface 11s is indicated with a dot-dash line to clarify the line of the curved surface 11s (the same applies to the other embodiments). As illustrated, in a sectional view in the wheel width direction Y, the well portion 11A does not have a straight portion, and the entire part of the well portion 11A between the hump portion H1 and the hump portion H2 is formed with a curved line 11s1. Further, in the well portion 11A, the curved line 11s1 extends in the wheel circumferential direction X (see FIG. 1) annularly about a wheel rotational axis O (see FIG. 1), forming the curved surface 11s.

Also, the curved line 11s1 is formed by a plurality of consecutive arcs 11e, 11f, 11g (in succession). In FIG. 2, for convenience purposes, the border between the arc 11e and the arc 11f is indicated with a border line Q1, and the border between the arc 11e and the arc 11g with a border line Q2. The arcs 11e, 11f, 11g are curves with radii of curvature R1, R2, R3 having points O1, O2, O3 as the centers of curvature, respectively. The centers of curvature O1, O2, O3 of the arcs 11e, 11f, 11g are located on the outer side Z1 of the curved line 11s1 in the wheel radial direction Z.

The arc 11e is formed in the center in the wheel width direction Y, the arc 11f is formed on one side of the arc 11e in the wheel width direction Y (the right side in FIG. 2), and the arc 11g is formed on the other side of the arc 11e in the wheel width direction Y (the left side in FIG. 2). Further, the radius of curvature R1 of the arc 11e is the largest, and the radii of curvature R2, R3 of the arcs 11f, 11g are smaller than that of the arc 11e. Thus, a center part of the curved surface 11s in the wheel width direction Y is a surface with a small degree of curving, and left and right sides thereof in the wheel width direction Y are surfaces with large degrees of curving, with the left and right surfaces rising toward the outer side Z1 in the wheel radial direction Z.

Further, at the border line Q1 between the arc 11e and the arc 11f, the arc 11e and the arc 11f form a smooth continuous curve. Also, at the border line Q2 between the arc 11e and the arc 11g, the arc 11e and the arc 11g form a smooth continuous curve.

A wall surface 16a that extends from the arc 11f of the curved line 11s1 toward the hump portion H1 has a protruding portion P1 at a portion substantially in the middle between an end portion of the arc 11f and the hump portion H1, the protruding portion P1 protruding toward the inside of the wheel in the wheel width direction Y. This protruding portion P1 extends above the wall surface 16a in the wheel circumferential direction X (see FIG. 1) and forms an annular shape about the wheel rotational axis O (see FIG. 1).

A wall surface 16b extending from the arc 11g of the curved line 11s1 toward the hump portion H2 has a protruding portion P2 at a portion substantially in the middle between an end portion of the arc 11g and the hump portion H2, the protruding portion P2 protruding toward the inside of the wheel in the wheel width direction Y. Like the protruding portion P1, this protruding portion P2 extends above the wall surface 16b in the wheel circumferential direction X (see FIG. 1) and forms an annular shape about the wheel rotational axis O (see FIG. 1).

The well portion 11A where the curved surface 11s is formed has substantially an even thickness between the protruding portion P1 and the protruding portion P2. Further, the protruding portion P1 is located closer to the wheel rotational axis O (see FIG. 1) than the protruding portion P2 is. Also, the well portion 11A is configured to be connected to the disk 12 at the position of the protruding portion P1.

The sub-air chamber member 10 is fitted when the tip of an edge portion 14a thereof is brought into contact with and pressed against the lower surface 17a of the protruding portion P1. Also, the sub-air chamber member 10 is fitted when the tip of an edge portion 14b thereof is brought into contact with and pressed against the lower surface 17b of the protruding portion P2.

Note that reference sign MC in FIG. 2 denotes a tire air chamber, and reference numeral 13 is a main body portion of the sub-air chamber member 10 to be described next. The main body portion 13 has a top plate 13a and a bottom plate 13b, which are joined to each other via joint portions 13c, 13d at respective end portions of the top plate 13a and the bottom plate 13b in the wheel width direction Y. Further, the main body portion 13 includes a sub-air chamber SC.

The top plate 13a is slanted in such a manner as to have a downward gradient in the wheel width direction Y from the hump portion H2 side to the hump portion H1 side. The top plate 13a has, at its both end portions in the wheel width direction Y, recessed portions 13e, 13f curving and recessed inward in the wheel radial direction Z. The bottom plate 13b is formed of a plate body formed to lie along the curved surface 11s of the well portion 11A. Further, the bottom plate 13b is formed to curve in the wheel circumferential direction X (see FIG. 1) with substantially the same curvature as the outer circumferential surface 11d (see FIG. 1). The sub-air chamber SC is formed inside the main body portion 13, surrounded by the top plate 13a and the bottom plate 13b.

Note that the sub-air chamber member 10 is assumed to be a resin mold here but is not limited thereto, and may be formed of other materials such as metal. Note that, in case of a resin, the resin is desirably a lightweight, highly rigid, and blow-moldable resin, considering factors such as reduction in weight, enhancement in mass productivity, reduction in manufacturing costs, and securement of air-tightness of the sub-air chamber SC. Above all, polypropylene is particularly desirable due to its strength against repeated bending fatigue.

Figure 7:
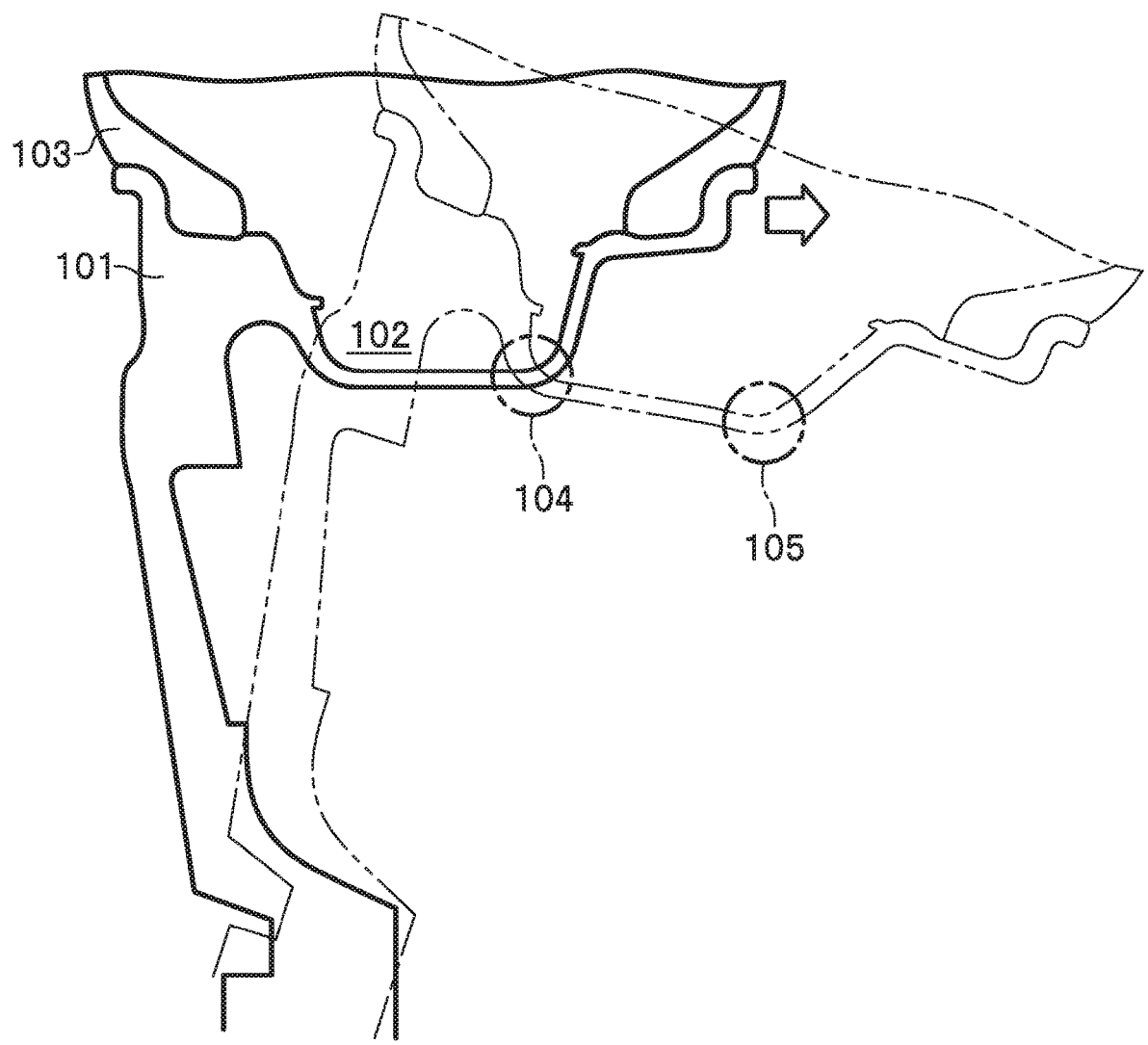
FIG. 7 is a diagram illustrating a conventional problem.

FIG. 3 is a table depicting the differences between rim lateral rigidity and its target value and between weight and its target value in the first embodiment and comparative examples. Note that the numeral values in the table are results calculated by CAE (computer-aided engineering). Further, in the table, Comparative Example 1 is a configuration including the well portion 102 having the shape illustrated in FIG. 7, and Comparative Example 2 is a configuration in which the recessed portion of the well portion 102 illustrated in FIG. 7 is thicker, although not shown. Further, the differences concerning the rim lateral rigidity (rigidity against lateral widening) on the left in the table were obtained using the first embodiment as a basis, and the differences concerning the weight of the wheel on the right in the table were obtained using Comparative Example 1 as a basis.

As a result, as depicted in FIG. 3, it was found that the rim lateral rigidity of the Comparative Example 1 calculated based on the target value (0%) which was of the first embodiment was minus 23% and was much lower than that of the first embodiment. By contrast, it was found that the rim lateral rigidity of the Comparative Example 2 was plus 1% and achieved only a small increase from the first embodiment. Further, it was found that the weight of the vehicle wheel of the first embodiment calculated based on the target value (reference value, 0%) which was of Comparative Example 1 was plus 2%, and a weight increase was reduced to a small one. By contrast, it was found that the weight of the vehicle wheel of Comparative Example 2 was plus 9%, and there was a large weight increase. As thus described, in the first embodiment, at the well portion 11A, stress concentration can be mitigated, and the amount of deformation can be reduced. Thereby, rigidity of the rim against lateral widening is enhanced, and steering stability performance is improved without a drastic increase in weight, i.e., weight-effectively.

As described above, the well portion 11A of the vehicle wheel 1A of the first embodiment includes: the hump portion H1 and the hump portion H2 protruding to the outer side Z1 in the wheel radial direction Z in a sectional view in the wheel width direction Y; and the curved surface 11s that connects the hump portion H1 and the hump portion H2 to each other and is recessed toward the inner side Z2 in the wheel radial direction Z. The curved surface 11s (having a shape without any straight portion in a sectional view in the wheel width direction Y) can mitigate stress concentration at the well portion 11A, and reduce the amount of deformation of the well portion 11A. As a result, rigidity of the rim (the inner rim) against lateral widening can be enhanced to improve steering stability.

Further, in the first embodiment, the curved surface 11s is formed by the consecutive arcs 11e, 11f, 11g whose centers of curvature O1, O2, O3 are located on the outer side Z1 of the curved surface 11s in the wheel radial direction Z. This makes it easy to form the well portion 11A which has a deep recess shape for a tall, narrow resonator. For example, the well portion 11A can have a shape such that the left and right wall surfaces extend upward when the arc 11e with a large radius of curvature R1 (with a large R) is the center in the wheel width direction Y and the arcs 11f, 11g with smaller radii of curvature R2, R3 (with a small R) than that of the arc 11e are at the left and right sides in the wheel width direction Y (the lateral direction in FIG. 2). Thereby, the well portion 11A with a deep recessed portion can be easily formed, which makes it easy to mount the tall and narrow sub-air chamber member 10 (resonator).

Second Embodiment

Figure 4:
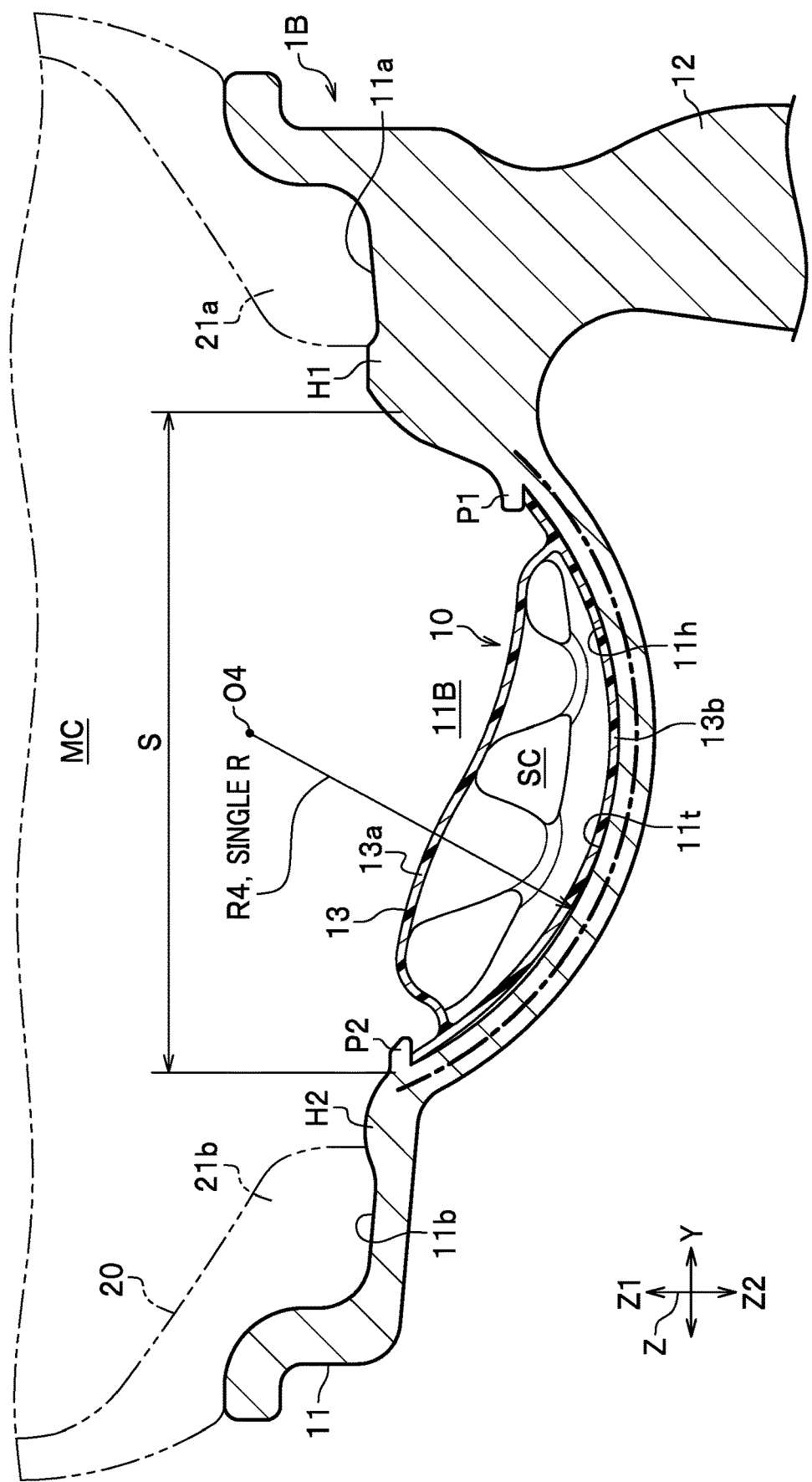
FIG. 4 is a sectional view of a vehicle wheel according to a second embodiment.

FIG. 4 is a sectional view of a vehicle wheel according to a second embodiment. Note that configurations similar to those of the first embodiment are denoted by the same reference numerals as used in the first embodiment (with omission of some reference numerals) and are not described again (the same applies to the third embodiment onwards).

As illustrated in FIG. 4, a vehicle wheel 1B of the second embodiment includes a well portion 11B in place of the well portion 11A in the first embodiment.

In a sectional view in the wheel width direction Y (in a sectional view in the width direction), the well portion 11B includes: the hump portion H1 and the hump portion H2 formed to protrude to the outer side Z1 in the wheel radial direction Z (radially outward); and a curved surface 11t that connects the hump portion H1 and the hump portion H2 to each other and is recessed toward the inner side Z2 in the wheel radial direction Z (radially inward).

In a sectional view in the wheel width direction Y, the curved surface 11t is configured so that the entire part between the hump portion H1 and the hump portion H2 forms a curved line 11h. The curved line 11h has a single curvature (1/R4) between the hump portion H1 and the hump portion H2. In other words, the curved line 11h is such that the entire part between the hump portion H1 and the hump portion H2 is shaped like an arc with a radius of curvature R4 having a point O4 as the center of curvature.

The radius of curvature R4 of the curved line 11h is set to be longer than half (½) a distance S between the hump portion H1 and the hump portion H2.

In the second embodiment thus configured, the curved surface 11t has a single curvature (1/R4), and therefore stress applied to the well portion 11B can be dispersed more evenly than the first embodiment where the well portion 11A is formed with a plurality of arcs 11e, 11f, 11g, and the amount of deformation of the well portion 11B can be reduced even more. As a result, steering stability can be improved.

Moreover, in the second embodiment, setting the radius of curvature R4 to be longer than half the distance S ensures that the curved surface 11t is formed over the entire part between the hump portion H1 and the hump portion H2 in the wheel width direction Y.

Third Embodiment

Figure 5:
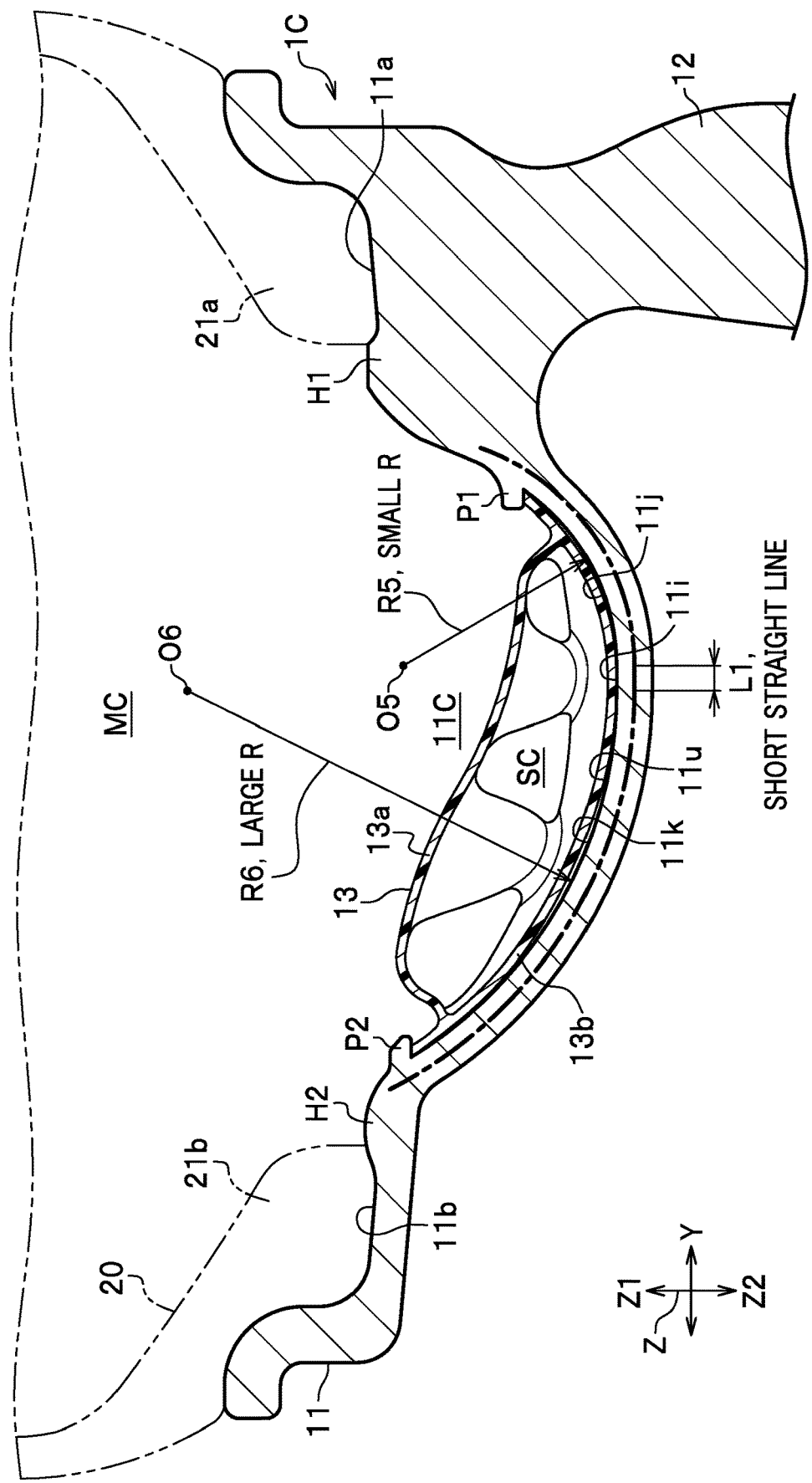
FIG. 5 is a sectional view of a vehicle wheel according to a third embodiment.

FIG. 5 is a sectional view of a vehicle wheel according to a third embodiment.

As illustrated in FIG. 5, a vehicle wheel 1C of the third embodiment includes a well portion 11C in place of the well portion 11A in the first embodiment.

In a sectional view in the wheel width direction Y (in a sectional view in the width direction), the well portion 11C has: the hump portion H1 and the hump portion H2 formed to protrude to the outer side Z1 in the wheel radial direction Z (radially outward); and a connection surface 11u that connects the hump portion H1 and the hump portion H2 to each other and is recessed toward the inner side Z2 in the wheel radial direction Z (radially inward).

In a sectional view in the wheel width direction Y (in a sectional view in the width direction), the connection surface 11u is recessed toward the inner side Z2 in the wheel radial direction Z, and has a straight line (straight portion) 11i, a curved line (curved line portion) 11j (a first curved line), and a curved line (curved line portion) 11k (a second curved line), the curved lines 11j, 11k being situated to sandwich the straight line 11i.

The curved line 11j is shaped like an arc with a radius of curvature R5 having a point O5 as the center of curvature (a small R). The curved line 11k is shaped like an arc with a radius of curvature R6 having a point O6 as the center of curvature (a large R). The radius of curvature R5 is smaller than the radius of curvature R6. Note that the shape may be such that the radius of curvature R5 is larger the radius of curvature R6.

Further, the length L1 of the straight line 11i in the wheel width direction Y is formed to be shorter than the length of the arc of the curved line 11j or the length of the arc of the curved line 11k.

In the third embodiment thus configured, in the wheel width direction Y (in a sectional view in the width direction), the well portion 11C includes: the hump portion H1 and the hump portion H2 protruding to the outer side Z1 in the wheel radial direction Z (radially outward); and the connection surface 11u that connects the hump portion H1 and the hump portion H2 to each other and is recessed toward the inner side Z2 in the wheel radial direction Z, and the connection surface 11u has, in a sectional view in the wheel width direction Y, the straight line 11i and the curved line 11j and the curved line 11k that are situated to sandwich the straight line 11i.

According to this configuration, an entire part from the straight line 11i to the hump portion H1 is formed by the curved line 11j, and an entire part from the straight line 11i to the hump portion H2 is formed by the curved line 11k. Thus, stress concentration can be mitigated at the well portion 11C, and the amount of deformation of the well portion 11C can be reduced. In other words, unlike before, there is no need to eliminate straight portions at both sides of an R portion or to increase the curvature of the R portion too much. Thus, stress concentration can be mitigated. As a result, rigidity of the rim against lateral widening can be enhanced to improve steering stability.

Moreover, in the third embodiment, the radii of curvature R5, R6 of the curved lines 11j, 11k are set to be longer than the length L1 of the straight line 11i in the wheel width direction Y (the width direction). With such a configuration, the lengths of the arcs of the curved lines 11j, 11k can be increased, allowing further mitigation of stress concentration and further reduction in the amount of deformation of the well portion 11C. Thereby, the rigidity of the rim 11 against lateral widening can be enhanced to improve steering stability even more.

Fourth Embodiment

Figure 6:
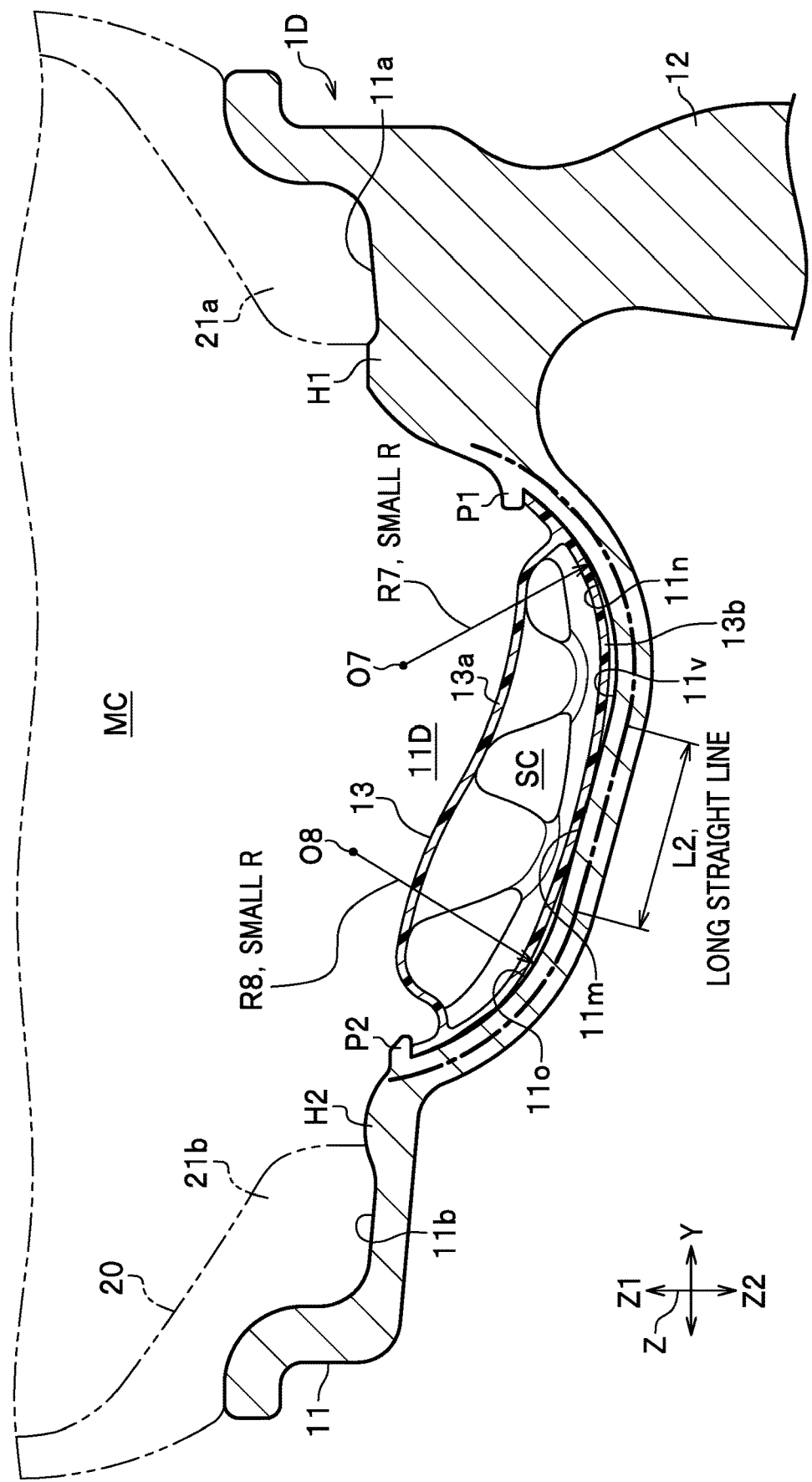
FIG. 6 is a sectional view of a vehicle wheel according to a fourth embodiment.

FIG. 6 is a sectional view of a vehicle wheel according to a fourth embodiment.

As illustrated in FIG. 6, a vehicle wheel 1D of the fourth embodiment includes a well portion 11D in place of the well portion 11A in the first embodiment.

In a sectional view in the wheel width direction Y (a sectional view in the width direction), the well portion 11D has: the hump portion H1 and the hump portion H2 formed to protrude toward the outer side Z1 in the wheel radial direction Z (radially outward); and a connection surface 11v that connects the hump portion H1 and the hump portion H2 to each other and is recessed toward the inner side Z2 in the wheel radial direction Z (radially inward).

In a sectional view in the wheel width direction Y (a sectional view in the width direction), the connection surface 11v is formed in a recessed manner and has a straight line (straight line portion) 11m, a curved line (curved line portion) 11n (a first curved line), and a curved line (curved line portion) 11o (a second curved line), the curved lines 11n, 11o being situated to sandwich the straight line 11m.

The connection surface 11v is shaped like an arc with a radius of curvature R7 having a point O7 as the center of curvature (a small R). The curved line 11o is shaped like an arc with a radius of curvature R8 having a point O8 as the center of curvature (a small R). The radius of curvature R7 and the radius of curvature R8 are substantially the same.

The length L2 of the straight line 11m in the wheel width direction Y is longer than that of the straight line 11i in the third embodiment. The curved line 11n is configured so that the entire part thereof from an end of the straight line 11m to the hump portion H1 forms a curve. The curved line 11o is configured so that the entire part thereof from the other end of the straight line 11m to the hump portion H2 forms a curve.

In the fourth embodiment thus configured, the well portion 11D includes the connection surface 11v that connects the hump portion H1 and the hump portion H2 to each other and is recessed to the inner side Z2 in the wheel radial direction Z, and the connection surface 11v has, in a sectional view in the wheel width direction Y, the straight line 11m and the curved lines 11n, 11o situated to sandwich the straight line 11m.

According to such a configuration, the entire part from the straight line 11m to the hump portion H1 is formed by the curved line 11n, and the entire part from the straight line 11m to the hump portion H2 is formed by the curved line 11o. Thus, stress concentration can be mitigated at the well portion 11D, and the amount of deformation of the well portion 11D can be reduced. In other words, unlike before, there is no need to eliminate straight portions at both sides of an R portion or to increase the curvature of the R portion too much. Thus, stress concentration can be mitigated. As a result, rigidity of the rim against lateral widening can be enhanced to improve steering stability.

Although the embodiments are described above, the present invention is not limited to the above embodiments and can be implemented in various modes. For example, although the first to fourth embodiments describe cases where the curved line in a sectional view in the width direction is shaped like an arc, the shape of the curved line is not limited to the arc shape as long as it is a curved shape, and may be other shapes such as an elliptical arc or a bow shape.

Further, although the first embodiment describes an example configuration where three arcs 11e, 11f, 11g are combined, the configuration may be a combination of two arcs or a combination of four or more arcs.

REFERENCE SIGNS LIST 1A, 1B, 1C, 1D vehicle wheel
10 sub-air chamber member
11 rim
11a, 11b bead seat
11A, 11B, 11C, 11D well portion
11d outer circumferential surface
11e, 11f, 11g arc
11i, 11m straight line
11s, 11t curved surface
11s1 curved line
11j, 11n curved line (first curved line)
11k, 11o curved line (second curved line)
11u, 11v connection surface
12 disk
13 main body portion
H1 hump portion (first hump portion)
H2 hump portion (second hump portion)
O1, O2, O3, O4, O5, O6, O7, O8 center of curvature
R1, R2, R3, R4, R5, R6, R7, R8 radius of curvature
X wheel circumferential direction
Y wheel width direction (width direction)
Z wheel radial direction (radial direction)
SC sub-air chamber
MC tire air chamber

The invention claimed is:

1. A vehicle wheel comprising a sub-air chamber member as a Helmholtz resonator attached to an outer circumferential surface of a well portion, wherein
the well portion includes
a first hump portion and a second hump portion protruding radially outward in a sectional view in a width direction, and
a curved surface that connects the first hump portion and the second hump portion to each other and is recessed radially inward, wherein
the sub-air chamber member includes first and second engaging parts at first and second ends of the sub-air chamber in the width direction, and wherein
a height of the first end of the sub-air chamber is different than a height of the second end of the sub-air chamber.

2. The vehicle wheel according to claim 1, wherein
the curved surface has a single curvature between the first hump portion and the second hump portion.

3. The vehicle wheel according to claim 2, wherein
a radius of curvature of the curved surface is set to be longer than half a distance between the first hump portion and the second hump portion.

4. The vehicle wheel according to claim 1, wherein
the curved surface is formed by a plurality of consecutive arcs whose centers of curvature are situated radially outward of the curved surface.

5. A vehicle wheel comprising a sub-air chamber member as a Helmholtz resonator attached to an outer circumferential surface of a well portion, wherein
the well portion includes
a first hump portion and a second hump portion protruding radially outward in a sectional view in a width direction, and
a connection surface that connects the first hump portion and the second hump portion to each other and is recessed radially inward, and
the connection surface has, in the sectional view in the width direction, a straight line and first and second curved lines situated to sandwich the straight line, wherein
the sub-air chamber member includes first and second engaging parts at first and second ends of the sub-air chamber in the width direction, wherein
a height of the first end of the sub-air chamber is different than a height of the second end of the sub-air chamber, wherein
radii of curvature of the first curved line and the second curved line are set to be longer than a length of the straight line in the width direction.

* * * * *